United States Patent [19]

McSwain et al.

[11] 4,449,542
[45] May 22, 1984

[54] PORTABLE HUNTING BLIND

[76] Inventors: Thad M. McSwain, 2103 Cherry; Elbert A. McCracken, 509 S. Main, both of Stuttgart, Ark. 72160

[21] Appl. No.: 333,728

[22] Filed: Dec. 23, 1981

[51] Int. Cl.³ .............................................. A45B 11/00
[52] U.S. Cl. .................................... 135/98; 135/901; 135/16; 135/24; 135/21
[58] Field of Search ............... 135/2, 1 R, 15 CF, 16, 135/19, 24, 8, 21, 5 B, D30, 98, 900–903

[56] References Cited

U.S. PATENT DOCUMENTS

| | | | |
|---|---|---|---|
| 2,196,544 | 6/1939 | Bagley | 135/5 B |
| 2,221,366 | 11/1940 | Bisbing et al. | 135/5 B |
| 3,052,251 | 9/1962 | DeJean, Jr. | 135/900 |
| 3,550,837 | 12/1970 | Erb | 273/D30 |
| 4,284,095 | 8/1981 | Norton | 135/21 |

FOREIGN PATENT DOCUMENTS 1033163  2/1951  France ................................. 135/21

*Primary Examiner*—Richard J. Apley
*Assistant Examiner*—Stephen R. Crow
*Attorney, Agent, or Firm*—Harvey B. Jacobson

[57] ABSTRACT

A portable hunting blind assembly having a collapsible umbrella roof structure supported from a central hollow cylinder and extending outwardly for terminating in a polygonal body having sides defined by the ribs of the roof structure, a handle supporting of the umbrella roof structure telescopically connected to an internal sleeve in the cylinder by means of a pivot arrangement, the handle received at its free end in a stake support structure or member having its distal end securely anchored in the ground, and an array of panel screening material sections depending from each of the polygonal sides of the roof structure and held firmly in the ground by anchor devices. The take member is telescopically collapsible and adjustable by being fixed to a maximum or some intermediary length values, and the entire portable hunting blind assembly can be reduced to its several component parts for insertion into a back carrying case receiving the components, the carrying case having straps for mounting for carrying on one's back.

9 Claims, 6 Drawing Figures

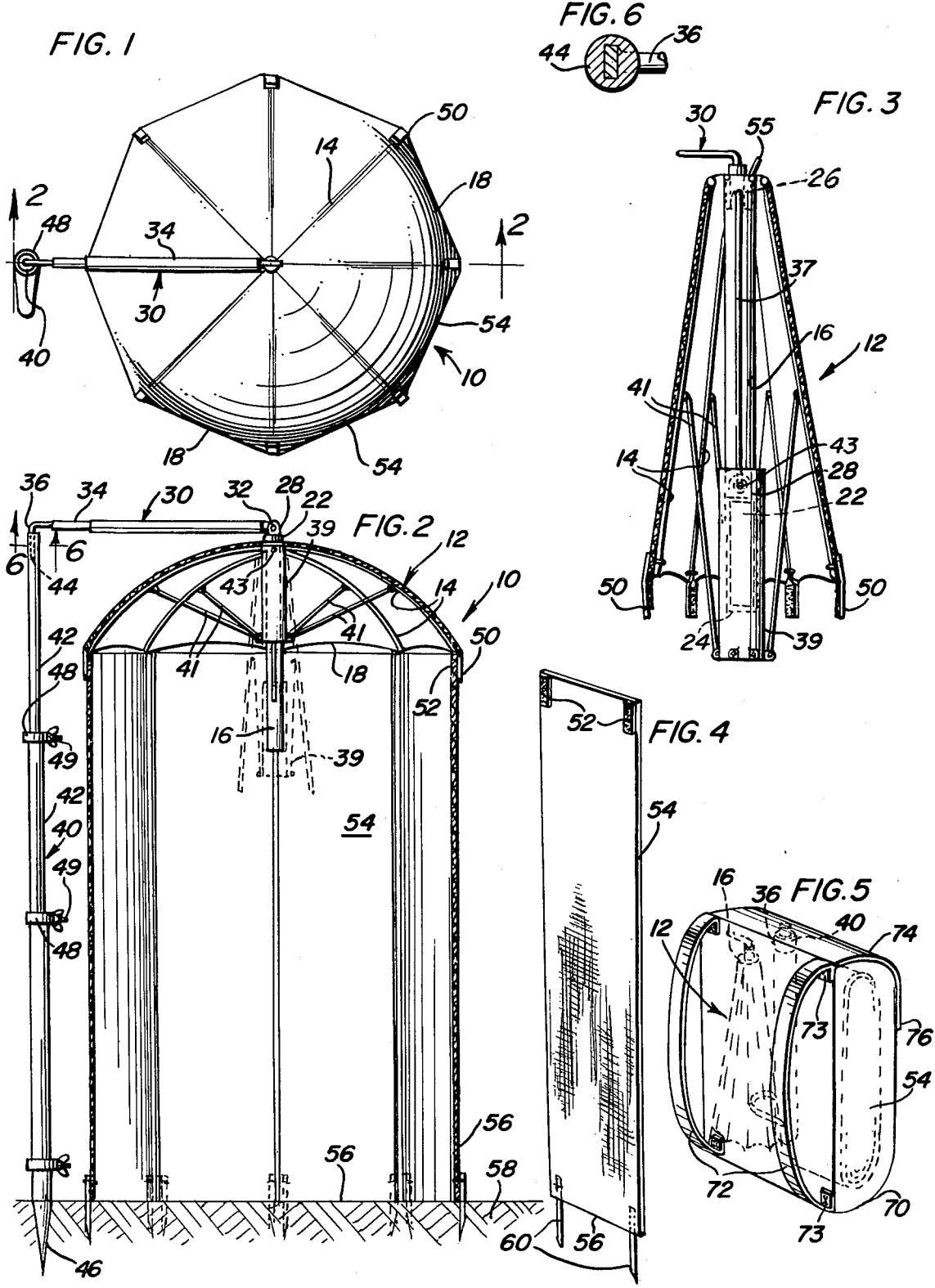

PORTABLE HUNTING BLIND

BACKGROUND OF THE INVENTION

The present invention relates to a portable hunting blind assembly including a collapsible umbrella structure extending from a hollow cylindrical support for the umbrella, a sleeve sliding internally of the cylinder body, a pivot connection on a projection from the sleeve and being coupled to one end of a telescopic member and having a handle at the other end in the form of a 90° turn, a collapsible stake member for mounting in the ground at one end and for receiving the handle at the other for supporting the umbrella roof structure, and a panel for each side defined at the periphery of the umbrella structure for enclosing and forming a blind for the hunter. More particularly, the invention relates to connection means, such as Velcro fastener elements for supporting the panel of screening material from the umbrella structure together with a carrying case for receiving the portable hunting blind components of the assembly in the carrying case and having the carrying case mounted by straps for carrying from one's back.

Field of the Invention

Hunting blinds presently used in the art and practice of hunting have various forms of usual constructions that are often permanent, not easily made portable, and are provided with connections or coupling elements that operate and function differently under various environmental and weather or moisture conditions. It is desirable to provide an arrangement of components such that grit, dirt, moisture and environmental features do not have any effect on the construction, maintenance and collapsibility of the several elements forming such assembly of hunting blinds, so that the device is easily packaged, stored, handled and yet remains an effective screening and camouflaged construction of elements for forming a portable hunting blind assembly.

Prior Art Disclosures

Various arrangements in tent constructions, umbrella arrangements and similar environmental constructions are known, such as illustrated in the following U.S. patents:

U.S. Pat. No. 373,378–Nov. 15, 1887–H. J. Rumrille
U.S. Pat. No. 941,458–Nov. 30, 1909–A. F. Leach
U.S. Pat. No. 1,581,180–Apr. 20, 1926–J. Csajaghy
U.S. Pat. No. 1,774,909–Sept. 2, 1930–W. H. Wells
U.S. Pat. No. 2,221,366–Nov. 12, 1940–C. F. Bisbing et al.
U.S. Pat. No. 2,652,845–Sept. 22, 1953–D. O'Neill et al.
U.S. Pat. No. 3,899,168–Aug. 12, 1975–Stella Besherse None of these above patents whether their disclosures are taken singly or in combination with each other adversely affects the patentability of any claim to the invention.

SUMMARY OF THE INVENTION

An object and advantage of the present invention is to provide a portable hunting blind assembly having its component parts rigid and substantially constructed so that it does not succumb to environmental conditions such as being blown over in the wind and in which the assembly is easily collapsible for storage, for portability, handling purposes and for erection when desired.

A further object and advantage of the present invention is to provide a portable hunting blind assembly that is inexpensive to construct and has ease in its assembly and disassembly. Also, the assembly of the invention has some adjustability since the supporting external stake for the umbrella arrangement or structure can be adjusted so that it can be used for standing position for the hunters as well as positioned high enough only for sitting position.

A still further object of the invention is to provide a portable hunting blind assembly that has fastener means for securing camouflaged panel structures to the umbrella structure by means of a separable, self adhering tape fastener means, such as "Velcro" fasteners, and the like.

Yet still a further object and feature of the present invention is to provide a detachable and adjustable hunting blind assembly which can be adjusted to form by use of the panels a complete enclosure of the space under the umbrella and yet may provide for conveniently collapsing the umbrella structure so that it may be closed and packed in a back carrying case by simple disassembly which is available by use of the fastener members of the invention.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a portable hunting blind assembly according to a preferred embodiment of the invention.

FIG. 2 is a sectional view taken along lines 2—2 of FIG. 1.

FIG. 3 is an enlarged sectional view of a collapsed umbrella section and other parts of the portable hunting blind assembly.

FIG. 4 is a perspective view of one of the several side panels with connection members according to the invention.

FIG. 5 is a perspective view of the component parts of the portable hunting blind assembly placed into a carrying case.

FIG. 6 is a sectional view taken along lines 6—6 of FIG. 2.

DETAILED DESCRIPTION OF THE INVENTION

Referring now to the drawings, there is shown a portable hunting blind assembly 10 having as one of its components a collapsible umbrella structure forming a roof 12 and having a plurality of ribs 14 which extend radially outward from a hollow central cylinder 16 that terminate in the periphery of the roof forming an edge shaped as a polygon having sides 18 associated between ends of the ribs. The construction of the roof is quite similar to that of any conventional umbrella forming a cover or as in this case a roof, but the central cylinder 16 is unique and comprises a hollow structure of metal or plastic having a sliding sleeve member 22 therein and which slides along the entire length of the hollow cylinder 16 from an end wall 24 to an inturned lip 26 shown in FIG. 3. The sleeve member 22 has a projection 28 which is coupled to an articulated telescopic arm or member 30 by a pivot 32 so the axis of member 30 may turn at least in a 90° arc from the axis of the cylinder 16.

The umbrella roof is opened by pulling the member 30 through the top of the roof 12 and when fully withdrawn from the cylinder 16, the member 30 pivots through 180° and has a flat end at arm 36 for engaging a slot or receiving recess 44 as shown in FIG. 6. The cylinder 16 has a slit 37 shown in FIG. 3 fixedly coupling the sleeve 22 with an outer sleeve 39 telescopically engaging the cylinder 16 and from which are provided conventional rib braces 41. Sleeves 22 and 39 are connected by a pin 43.

The telescopic member 30 has telescopic components 34 and the distal end forms a 90° turn from the axis of arm 36. Supporting the structure forming the roof 12 is a support pole or stake 40 formed of several component telescopic elements 42 and in which the smaller or inner element has a receiving recess 44 that accepts or receives in sliding engagement the arm 36. At the other end or large element end there is a pointed stake or end member 46 for projecting into the ground sufficiently so that the entire assembly of telescopic elements are supportive and rigid and are adjusted into secured or fixed relation by members 48 with wing nuts 49 that tighten adjacent ones of the elements 42 together. Hook releases the umbrella structure so that the roof is collapsed in disassembly of the roof umbrella.

From the peripheral portion of the roof 12 and proximate to each of the free ends of the ribs, are fastener members 50 that matingly fasten or engage with further fastener members 52 on each of the screens or panels 54 which are attached by sewing, or similar constructions, onto the corners of each of the panels 54. The panels 54 form a circumferential wall or covering of flexible sheet fabric or material. The panels are supported from the corners and depend from the fastener members 50, 52, enclosing in the polygon-shaped roof 12. Lower extremities 56 of the panels 54 approach or contact the ground 58 and the lower corners of the panels are attached to anchor pins 60 extending into the ground and that tighten the panel or rigidify the construction so that the hunting blind is secure. Thus, wind or other enviromental factors do not generally affect the portable structure while the spike 46 and anchors 60 are placed securely in the ground.

The panels may be a fine opaque metal or plastic screening material and having coatings, other materials or like means to color the material of the panels 54 and the panels may thus be of camouflaged screens or nettings that augment the construction assembly functioning as a complete hunting blind. The stake 40 may have its length adjusted from a maximum length where the hunting blind allows for the hunter to stand, to a shorter height by adjustment of members 48 so that the hunting blind assembly 10 is adapted for the hunter to sit rather than to standing.

Fastener members 50, 52 can be a self-adhering tape fastener, having an interacting permanent hook tape and an interacting loop or pile tape, such as forming a "Velcro" fastener, a construction disclosed in a U.S. patent to George De Mestral U.S. Pat. No. 2,717,437.

The hunting blind assembly 10 can be dismantled by reversal of the erection process such as first by removal of the arm 36 from the recess 44, collapsing the components 34 into the member 30, pivoting the member 30 into axial alignment with the cylinder 16 into which it is then slid, collapsing the ribs of the umbrella roof 12 similar to that showing in FIG. 3 after removal of the panels 54 by detaching the tape fastener 52 from fastener 50 and removing the anchor pins from the ground. These separate components of the assembly can be placed and stored in a carrying case 70 shown in FIG. 5 and which is provided with a set of shoulder engaging straps 72 having ends 73 sewn or secured on a side of the carrying case, while on another side 74 a cover flap 76 extends midway of the face of the side 76 and may be retained in position by fastener members such as further fastener members 50 (not shown).

The panels can also be constructed for forming a generally square configured hunting blind. The panels may be of a fully encircling camouflage drape material and the assembly of the invention is used while hunting wildlife, and the enclosing panels encircle and conceal both hunter and gear.

The hunting blind of the invention is a lightweight shelter that is easy to carry and erect on location at a site that places one in complete command for hunting ducks, turkey, deer, doves and the like, and photography of the same, as desired. Assembly or disassembly is accomplished in 4 to 8 minutes. It is usable in rain, sun, insect area-protection and hides from sight of wildlife. It is also adjustable from a sitting position to a height of 7 feet.

The device of the invention includes opening the umbrella from the upside or outside of the umbrella, the shaft having a sliding pull handle 36 extending from the cylinder 16 that pulls through the top of the umbrella and locks in an open position by clip or hook 55.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A portable hunting blind assembly comprising a collapsible umbrella roof means having a plurality of ribs extending from a central cylinder to the periphery of the roof means, the distal ends of the ribs defining points for sides of a polygon edge, the central cylinder extending from the roof means centrally within the roof means for a length proximate the free ends of the ribs, an inner sleeve member for sliding within the length of the central cylinder from end-to-end thereof and having a projection extending from the sleeve member external of the central cylinder, a telescopic member connected by pivot means at one end to the projection and having an arm termination at the other end, an outer sleeve member for sliding on the exterior of the central cylinder, the outer sleeve member being provided with braces connected to the respective ribs, means connecting the inner and outer sleeve members for movement in unison lengthwise of the central cylinder, a telescopic stake means having its telescopic sections comparable to the length of the central cylinder and with a recess at one end of the telescopic stake means for receiving the arm termination and with a spike point at the other end, and means forming a circumferential wall of flexible sheet fabric depending from the peripherally defined sides of the polygon of the roof means for enclosing with the roof to define the portable hunting blind.

2. The invention of claim 1 wherein the wall forming means comprises a plurality of separate panels for the respective sides of the polygon and means for releasably attaching the panels to the respective peripherally defined sides of the roof, each of ground contacting edges of the panels being provided with anchor pins to fasten into the ground.

3. The invention of claim 1 wherein the means connecting the inner and outer sleeve members comprises a pin extending through a lengthwise slot formed in said central cylinder.

4. The invention of claim 1 wherein a carrying case with shoulder straps encompasses the entire assembly in its collapsed and retracted state.

5. The invention of claim 2 wherein the panels are each fastened to the roof means by a self-adhering tape "Velcro" type fastener means.

6. The invention of claim 1 wherein the arm termination performs as an external handle to the umbrella roof means in opening and collapsing the roof means.

7. The invention of claim 1 wherein the telescope stake means includes adjustment means at each of the interconnecting sliding components forming the telescopic stake means, the adjustment means locking the interconnecting sliding components together and for releasing the locking relation when the assembly is dismantled or adjusted in height.

8. The invention of claim 1 wherein the attachment means comprises a separable, self-adhering tape fastener means securing the panels to respective ones of the polygonal edges.

9. The invention of claim 1 wherein a back carrying case is provided to contain all the components of the assembly.

* * * * *